Nov. 16, 1948.    C. W. BOPP    2,453,741
HYDRAULIC HOSE COUPLING
Filed Feb. 24, 1947    2 Sheets-Sheet 1
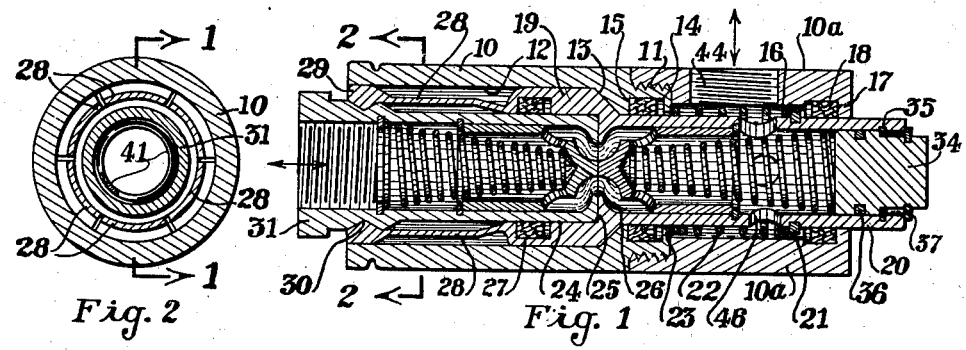
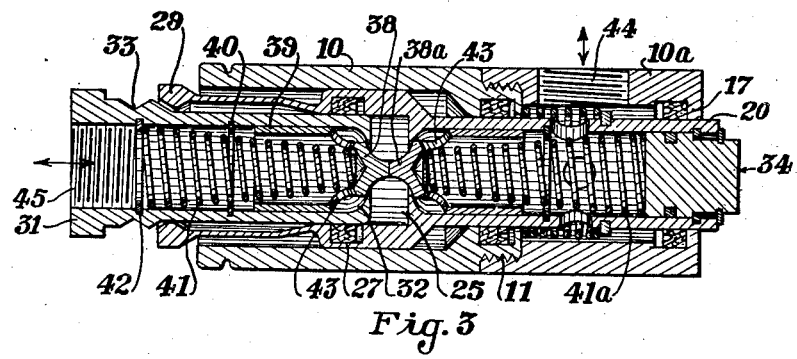
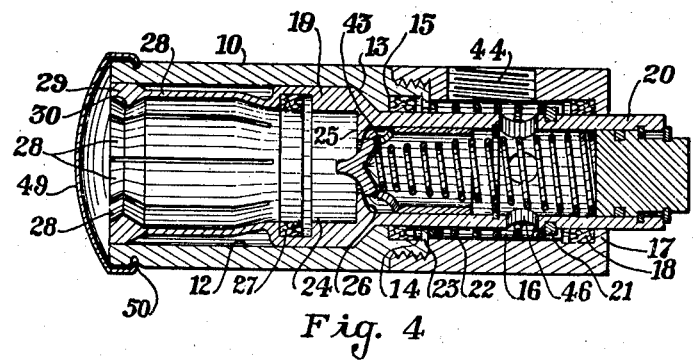
INVENTOR.
C. W. BOPP
BY Martin E. Anderson
ATTORNEY Nov. 16, 1948.  C. W. BOPP  2,453,741
HYDRAULIC HOSE COUPLING Filed Feb. 24, 1947  2 Sheets-Sheet 2

INVENTOR.
C. W. BOPP
BY Martin E Anderson
ATTORNEY

Patented Nov. 16, 1948

2,453,741

UNITED STATES PATENT OFFICE 2,453,741

HYDRAULIC HOSE COUPLING

Cecil W. Bopp, Waterloo, Iowa

Application February 24, 1947, Serial No. 730,325

4 Claims. (Cl. 284—18)

1

This invention relates to improvements in hydraulic hose couplings.

In many places, but more especially in connection with tractors and implements or trailers connected therewith, it is frequently necessary to conduct fluid such as oil under high pressure, from the tractor to the implement or trailer for the purpose of operating mechanisms on the trailer or for applying brakes or for other similar purposes.

In effecting connections between hose sections positioned on separable elements, such as tractors and trailers, it is of great importance to have a coupling that will separate automatically in response to tensional strains beyond predetermined limits so that if the coupling between the tractor and the trailer is disconnected accidentally or otherwise the hose connection will not break when subjected to resulting strains.

It is the object of this invention to produce a hose coupling of such construction that it will pull apart if the drawbar becomes disconnected, without causing any damage to the hose or coupling.

Another object of this invention is to produce a hose coupling of such construction that if it become disconnected, due to longitudinal strains, only a small amount of oil will be lost.

A further object of the invention is to produce a hose coupling of such design and construction that it may be readily disconnected manually whenever desired and which, in addition, can be readily connected.

A further object of the invention is to produce a hose coupling of such construction that any dirt that may come in contact therewith, when the parts are separated, can be easily removed so as to prevent it from being conducted to the mechanism operated by the fluid.

It is at present quite customary to provide tractors of the type employed for agricultural purposes, with hydraulic pumps that deliver oil under pressures as high as 800 or 900 pounds, per square inch. Implements such as plows, scrapers and other farm implements are so constructed that they may be controlled or operated by means of hydraulic plungers and it is therefore customary to connect the tractor with the implement by means of a strong hose. The two hose sections are, of course, interconnected by couplings of various kinds. In such a combination, it is very desirable to have hose coupling that automatically closes against the escape of fluid when the parts are disconnected.

The above objects and any others that may

2 become apparent as this description proceeds are attained by means of a construction and an arrangement of parts that will now be described in detail and for this purpose reference will be had to the accompanying drawings in which the invention has been illustrated in its preferred form, and in which:

Figure 1 is a longitudinal diametrical section taken on line 1—1, Figure 2, and shows the parts in operative position;

Figure 2 is a transverse section taken on line 2—2, Figure 1;

Figure 3 is a section similar to that shown in Figure 1, but shows the parts in the position they occupy either directly before the coupling has been effected or shortly after the couplings have been moved to effect separation;

Figure 4 is a section showing one of the coupling elements in inoperative position with a dust seal connected therewith.

Figure 5:
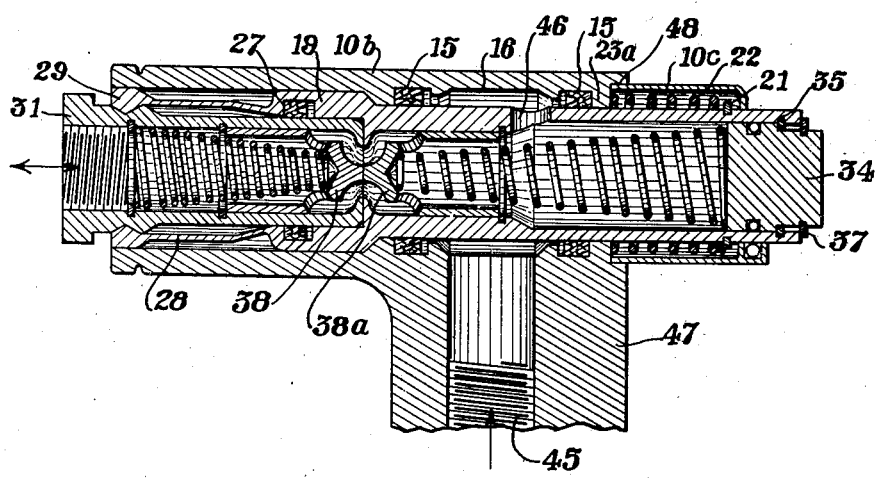
Figure 5 is a longitudinal diametrical section similar to that shown in Figure 1, but showing a slightly modified construction.

Referring now to the drawing, reference numeral 10 designates the main body of the coupling which is formed in two parts, the other part being designated by reference numeral 10a. These two parts have been shown as threadedly connected at 11. The main body member 10 is provided with a cylindrical opening 12 that terminates in an inclined frustoconical surface 13. An annular groove 14 is formed in the inner surface of member 10 and contains an oil seal 15. Body member 10a is cylindrical and is provided with a cylindrical opening 16 that terminates in an inwardly extending flange 17. An oil seal 18 is positioned adjacent the inner wall of flange 17.

Positioned within the main body members just described is a tubular clamping sleeve, a portion of which has been designated by reference numeral 19. The outside diameter of part 19 is such that it has a sliding fit with the cylindrical opening 12. The righthand end of part 19 has a frustoconical surface that fits against conical surface 13 when the parts are in the position shown in Figure 1. From the frustoconical surface a cylindrical sleeve-like portion 20 extends to a point beyond the outer end of body portion 10a. Sleeve 20 is provided with a groove in which is positioned a snap ring 21 that serves as an abutment for the clamping sleeve spring 22, whose other end abuts the inwardly extending flange 23 at the extreme right of the main body portion 10. Clamping sleeve 19 is hollow throughout its entire length and has a cylindrical opening whose inner wall has been designated by reference numeral 24 and this terminates in an inwardly extending flange 25. The opposite side of flange 25 is curved as shown at 26. An oil seal 27 is positioned in a groove in the inner surface of section 19 of the clamping sleeve. Extending to the left from section 19 are six fingers 28 that have enlarged ends 29. The inner surfaces of ends 29 is V-shaped in transverse section, as indicated at 30. The parts are so adjusted that spring 22 will normally hold the clamping sleeve with its frustoconical surface in contact with frustoconical surface 13, as shown in Figures 1 and 4. Positioned within the clamping sleeve is a hose adapter which has been designated in its entirety by reference numeral 31. This is a cylindrical tubular member whose outside diameter is of a size to fit the inside diameter of the clamping sleeve as shown at 24. The inner end of the hose adapter is provided with an inwardly extending flange 32, as shown most clearly in Figure 3. The outer surface of this flange fits against the abutting surface 25 of the clamping sleeve. The hose adapter is provided on its outer surface with a V-shaped groove 33 of the proper size and shape to receive the V-shaped projection on the inner surface of enlarged ends 29. The parts are so adjusted and dimensioned that they will normally occupy the position shown in Figure 1 when the coupling is not subjected to any considerable longitudinal strains.

The outer end of the cylindrical tubular part 20 of the clamping sleeve is closed by means of a plug 34 that is held in place by a snap ring 35. A ring 36 fits in a groove in plug 34 and serves as a seal and if desired another snap ring like that designated by reference numeral 37 may be applied to plug 34 so as to prevent its inward movement relative to part 20.

The valve members 38 and 38a are associated with the parts already described. Valve member 38 is positioned within the hose adapter 31 and has a cylindrical skirt 39 of some length. Snap ring 40 is positioned in a groove in the inner surface of the hose adapter and serves as a stop that limits the outward movement of valve member 38. A slightly tapering valve spring 41 has its narrow end positioned in valve 38 and its outer or larger end abutting the snap ring 42. Spring 41 is under compression and normally tends to hold the valve 38 in sealing engagement with the curved surface 32 of the hose adapter, forming a seal. Valve member 38a is positioned within the tubular part 20 of the clamping sleeve and cooperates with the inwardly extending flange whose outer surface has been designated by reference numeral 25, in Figure 1. A spring 41a has its outer end in abutment with the inner surface of plug 34 and serves to urge valve member 38a into sealing engagement with the flange in the manner shown in Figure 3. A snap ring like that designated by reference numeral 40 serves as a stop for valve 38a. It will now be apparent that unless the valve members 38 and 38a are acted upon by forces that tend to move them away from the seats with which they are shown in contact in Figure 3 they will prevent the escape of fluid. Valve members 38 and 38a are provided with one or more holes 43 for a purpose which will presently appear.

In Figures 1 to 3, body members 10a has been shown as provided with a threaded opening 44, which is threadedly connected with a pipe coming from the high pressure pump of the tractor. This pipe has not been shown, but it forms a stationary support for the coupling. The hose that extends to the trailer or implement connected with the tractor is threadedly connected with the threaded section 45 of the hose adapter 31.

It will be observed that tubular part 20 is provided with a number of openings 46 that communicate the interior of cylindrical sleeve 20 with the fluid supply pipe connection with the threaded opening 44 so that the interior of the cylindrical portion of the clamping sleeve is always filled with a fluid under pressure that is prevented from escaping so long as valve member 38a is seated in the manner shown in Figure 3.

In Figure 5 a slightly modified construction has been shown in which the body members 10 and 10a have been replaced by a body member 10b. Instead of the threaded opening 44 being in the wall of the body member, a projection or handle portion 47 has been provided through which the threaded opening 45 extends and communicates with the enlarged opening 16. The ends of opening 16 are sealed by means of a packing 15 that seals against escape of fluid endwise. Instead of section 10a of Figures 1 to 3, a cap 10c has been provided which encloses spring 22. This cap is secured to body member 10b along the flange 48. Spring 22 has one end in abutting relation with the ring 21, the same as in the other figures while the other end of the spring abuts the flange 23a. In other particulars the coupling illustrated in Figure 5 is the same as the one illustrated in the other figures, the principal differences residing in the position of spring 22. By thus positioning this spring, the threaded joint indicated by 11 in Figure 1 can be dispensed with and the entire body member be formed of a unitary piece.

Let us now assume that the parts are in the position shown in Figure 3 and that the bodies 10, 10a are connected to the end of a pipe containing oil or other liquid under pressure and that a hose is connected with the threaded end of member 31. Pressure is exerted on the plug 34 in the direction of arrow P moving the clamping sleeve towards the left to the position shown, after which the hose adapter 31 is inserted as shown and pushed towards the right until the V-shaped projection at 29 drops into the correspondingly shaped groove 33, whereupon the parts can be moved into the position shown in Figure 1. During this coupling movement in which the hose adapter moves inwardly from the position shown in Figure 3 to that shown in Figure 1, valve members 38 and 38a will be moved away from their seats, thereby opening a passage for liquid from the interior of the tubular sleeve 20 into the interior of the hose adapter. After the parts are in the position shown, the valve that is positioned between the coupling element and the pump, or other pressure supply, may be opened, whereupon liquid can flow freely into the hose connection with the hose adapter. The parts are so arranged that the forces that tend to separate the members are exerted against the inner end of plug 34 and the hose adapter, but such forces have no component tending to move the clamping sleeve and therefore the parts will remain in assembled position, regardless of the pressure of the fluid that is being transmitted.

The body 10, 10a is connected stationarily with the tractor and therefore if the connection between the tractor and trailer or the tractor and a farm implement accidentally breaks, the pull from the hose will move the parts towards the left against the action of spring 22 until the ends 29 arrive at a position outside of the main body, whereupon the hose adapter is free to seperate, and during this separation, valve member 38 moves to sealing position and this is also true of valve member 38a. The hose to which the adapter 31 is connected is then entirely free from the body of the coupling and since the end of the hose, as well as the discharge end of the coupling, automatically seal during such separating movement, there is no loss of oil or liquid except for an insignificant amount that may be in the passages before the valves close.

The operation of the device shown in Figure 5 is exactly the same as that shown in Figures 1 and 3, the difference, as above pointed out, being merely a slight difference in design.

If the coupling is to be inoperative for some length of time, a dust cap like that designated by reference numeral 49 is applied to end of the main body 10, as shown in Figure 4. This cap is so constructed that it can be snapped on and is held in place by the inturned flange 50, or some other equivalent means.

The coupling that has been described above is primarily intended for use with tractors having farm implements or trailers connected therewith, but can also be used in many other places. It is adapted for use wherever a hose is to be connected and disconnected from a pressure supply, as, for example, a garden hose or steam hose. The hose may be provided with an adapter like the one designated by reference numeral 31 and the other part of the coupling may be permanently connected with the source of fluid under pressure.

Particular attention is called to the great simplicity of this coupling and to the design that gives it great strength and rigidity.

Having described the invention what is claimed as new is:

1. A hose coupling comprising, a tubular body having axial openings of different diameters extending inwardly from opposite ends, the larger opening terminating in an annular shoulder, a tubular clamping sleeve mounted in the body for relative longitudinal movement, the sleeve having two sections of unequal outside diameters adapted to fit the correspondingly sized openings in the body, the wall of the opening of smaller diameter in the body having an enlarged section, an inlet port opening in communication therewith, the wall of the clamping sleeve having an opening in communication with the enlarged section, the outer end of the axial opening in the smaller end of the clamping sleeve having a removable plug closure, the inner end of the last named opening terminating in an inwardly extending flange forming a valve seat, a valve slidable in the opening, means comprising a spring for urging the valve to closed position, means comprising a spring for urging the clamping sleeve in the direction of its smaller end relative to the body, the end of the clamping sleeve having the larger outside diameter terminating in a plurality of resilient fingers whose ends are provided on the inside with convex surfaces lying in a plane perpendicular to the axis of the clamping sleeve, and on the outside with arcuate surfaces, and a tubular hose adapter of a size to fit the opening in the larger end of the clamping sleeve, in abutting relation with the flange, the inner end of the hose adapter having an inwardly directed flange forming a valve seat, a valve positioned in the adapter, movable into sealing relation with said valve seat, a spring urging the valve towards the seat, the outer surface of the adapter having a concave groove adapted to receive the convex inner surfaces of the fingers to hold it in operative position when the clamping sleeve is positioned entirely within the body.

2. A hose connector for use in effecting a connection between two hydraulic devices employing liquid under pressure, comprising, an elongated tubular body having axially aligned openings of different diameters, an annular abutment surface at the inner end of the larger opening, a tubular clamping sleeve extending entirely through the body, the sleeve having a cylindrical portion of a size to fit the smaller opening in the body and a larger cylindrical section of a size to fit the body opening of larger diameter, the wall of the sleeve having a plurality of flexible fingers whose ends terminate inwardly extending V-shaped projections, the outer ends of the fingers being transversely arcuate and adapted to fit the inside of the larger diameter opening in the body, the tubular cylindrical end of the clamping sleeve having its outer end closed by a removable plug, the inner end of the clamping sleeve section of smaller diameter having an inwardly extending flange forming a valve seat, a valve positioned between the valve seat and the plug, means for urging the valve towards the seat comprising a compression spring in abutting relation with the valve and the plug, the cylindrical end of the clamping sleeve having a hole, the body member having an inlet opening, the inside of the wall of the body surrounding that part of the cylindrical sleeve having the hole being enlarged to form a passage for fluid from the inlet, and a tubular hose adapter for insertion in the larger end of the clamping sleeve, the adapter terminating at its inner end in an inturned flange forming a valve seat, a valve slidable in the adapter, means comprising a compression spring for urging the valve towards the seat, the outer end of the outer surface of the adapter having a groove for the reception of the convex inner surfaces of the fingers, means comprising a spring for urging the clamping sleeve towards the abutment wall, and means comprising projections on the valves for moving them to open position when the adapter is in its innermost position.

3. A hose connector for use in effecting a connection between two hydraulic devices employing liquid under pressure, comprising an elongated tubular body having axially aligned openings of different diameters, an annular abutment surface at the inner end of the larger opening, a tabular clamping sleeve extending entirely through the body, the sleeve having a cylindrical portion of a size to fit the smaller opening in the body and a larger cylindrical section of a size to fit the body opening of larger diameter, the wall of the sleeve having a plurality of flexible fingers terminating in inwardly extending enlargements, convex in an axial plane, the outer ends of the fingers being transversely arcuate and adapted to fit the inside of the larger diameter opening in the body, the tubular cylindrical end of the clamping sleeve having its outer end closed by a removable plug, the inner end of the clamping sleeve section of smaller diameter having an inwardly extending flange forming a valve seat, a valve positioned between the valve seat and the plug, means for urging the valve towards the seat comprising a compression spring in abutting relation with the valve and the plug, the cylindrical end of the clamping sleeve having a hole, the body member having an inlet opening, the inside of the wall of the body surrounding that part of the cylindrical sleeve having the hole being enlarged to form a passage for fluid from the inlet, and a tubular hose adapter for insertion in the larger end of the clamping sleeve, the outer end of the adapter having a groove for the reception of the convex inner surface of the fingers, means comprising a spring for normally holding the clamping sleeve in engagement with the abutment and means carried by the hose adapter for opening the valve when the adapter is in its innermost position.

4. A hose coupling, comprising, in combination, an outer elongated tubular body having an inwardly extending flange substantially midway between its ends, an elongated inner tubular body positioned within the first mentioned tubular body, the outer surface of the inner tubular body comprising two cylindrical sections of different diameters, one of which extends through the opening in the inwardly extending flange of the outer tubular body, the other cylindrical section having a larger diameter, the part connecting the two sections of different diameter forming a shoulder for engaging the inwardly extending flange in the outer body, means comprising a helical spring surrounding a portion of the cylindrical section of smaller diameter of the inner tubular body for urging the shoulder into engagement with the flange, means sealing the ends of the chamber in which the helical spring is positioned, the walls of the two tubular bodies having openings communicating with the sealed chamber, the opening in the inner tubular member terminating in an inwardly extending flange forming a valve seat, a valve mounted for sliding movement in the space between the valve seat and the outer end of the opening, a plug sealing the outer end of the opening, means for urging the valve into engagement with the valve seat comprising a helical compression spring positioned between the valve and the plug, the wall of the opening in the inner tubular member, on the opposite side of the valve seat from the valve, comprising a cylindrical section, the outer end being separated into a plurality of fingers with thickened end portion, the inner surfaces of the ends of the fingers being convex in a diametrical plane, the fingers being normally within the outer tubular member.

CECIL W. BOPP.

REFERENCES CITED

The following references are of record in the file of this patent:

UNITED STATES PATENTS

| Number | Name | Date |
|---|---|---|
| 1,073,719 | Timmer | Sept. 23, 1913 |
| 1,744,305 | Gannaway | Jan. 21, 1930 |
| 1,871,370 | Jacques | Aug. 9, 1932 |
| 2,255,333 | Scheiwer | Sept. 9, 1941 |